Jan. 15, 1957  R. W. POWELL ET AL  2,777,812
LEAK DETECTION SYSTEM
Filed March 12, 1952
2 Sheets-Sheet 2
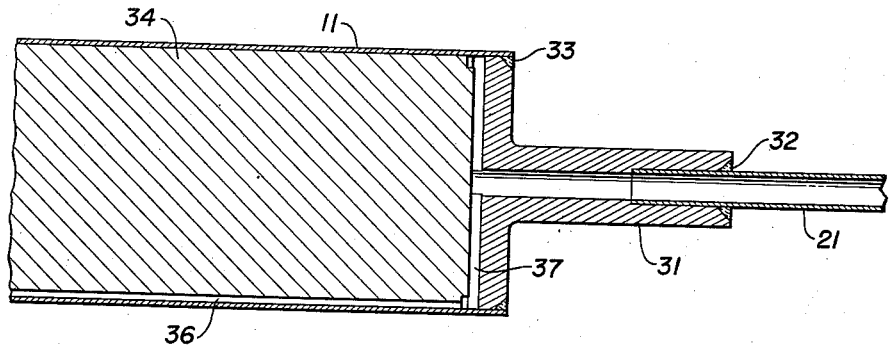
Fig. 2.
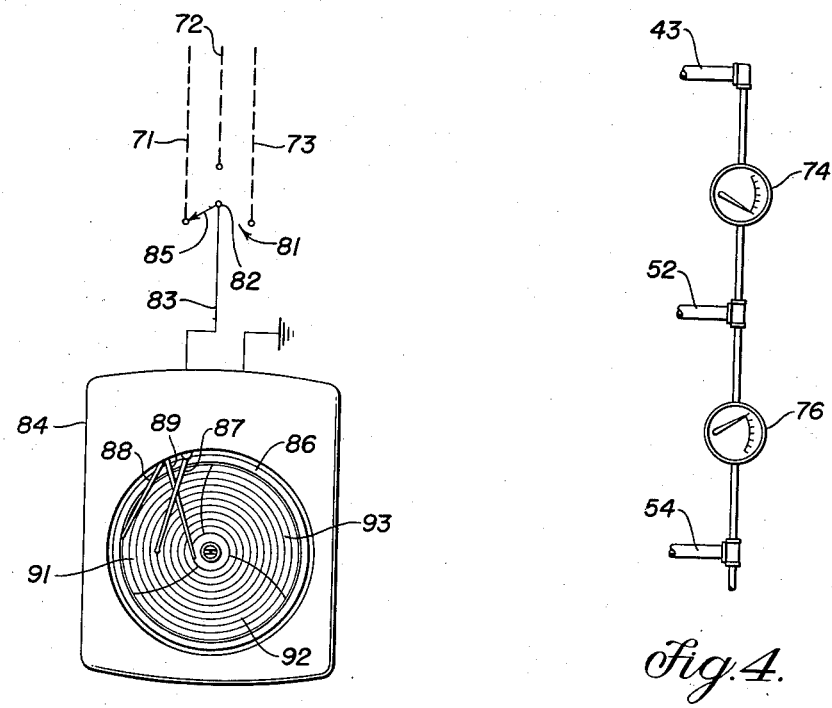
Fig. 3.
Fig. 4.
INVENTORS.
ROBERT W. POWELL
PAUL H. LEE
BY
ATTORNEY.

United States Patent Office 2,777,812
Patented Jan. 15, 1957

2,777,812

LEAK DETECTION SYSTEM

Robert W. Powell, Sayville, N. Y., and Paul H. Lee, Belle Haven, Va., assignors to the United States of America as represented by the United States Atomic Energy Commission Application March 12, 1952, Serial No. 276,172

4 Claims. (Cl. 204—193)

This invention relates to a new and improved apparatus for detecting a leakage of pressure in one of a plurality of similar pressurized spaces by means of sequential isolation of the leaking pressure space. More particularly, it relates to a leak detection system adapted for locating a defective container in a plurality of hermetically sealed pressurized containers.

The apparatus has particular application in an air cooled fissionable fuel-graphite neutronic reactor wherein a large number of the fuel elements, known as slugs, are used, although in its broader aspects, the invention is in no way limited to any single type of reactor. Specific details of the theory and essential characteristics of reactors of this type and others using solid fuel elements are set forth in Fermi et al. Patent 2,708,656. In reactors the slugs must be encased in hermetically sealed containers to prevent, for example, the escape of radioactive fission products and the resulting contamination of the exhaust fans used to draw the air through the reactor. The technique of preparation of such containers with the fuel elements therein is well developed. A report describing the details of the preparation of the containers and their structure with the fuel therein is BNL-54, "Final Report on Reactor Fuel Element Research, Development and Production," May 1, 1950, Brookhaven National Laboratory (declassified July 16, 1956). When a container ruptures inside the reactor, or is found to be defective, it is imperative that some indication be given before serious damage results. Since the containers are imbedded in the graphite and located within the reactor shield, it is not practical to inspect them visually. Even in systems where the hermetically sealed containers are capable of visual inspection, the number of containers used may preclude any such inspection on a continuous basis. On the other hand, the present invention may be used with any number of containers in the system and without reliance upon visual inspection.

It is accordingly an object of the present invention to provide a new and improved apparatus for externally detecting and segregating a pressurized unit having a defect which gives rise to a drop of pressure therein.

A second object is to provide a new and improved apparatus for locating a ruptured hermetically sealed container without visually inspecting the containers.

Another object is to provide a new and improved apparatus for preventing, in a heterogeneous nuclear reactor, the oxidation of the fissionable material in a ruptured container.

More particularly, the apparatus is adapted for use with a plurality of hermetically sealed pressurized containers arranged in a geometric pattern of columns and rows comprising intersecting first and second dimensions of said pattern and employing a gas source for filling the containers to a common predetermined pressure, first pressure responsive means connected between adjacent container columns for measuring the differential pressure therebetween, second pressure responsive means connected between adjacent rows for measuring the differential pressure therebetween and flow regulating means for disconnecting the first pressure measuring means from the filled containers and connecting the second pressure measuring means thereto.

The many objects and advantages of the present invention may best be appreciated by reference to the accompanying drawings, the figures of which illustrate apparatus incorporating a preferred embodiment of the present invention and capable of carrying out the method of the invention. In the drawings:

Figure 2 is a transverse sectional view of the coupling between the hermetically sealed container and the tubing of the apparatus.

Figure 3 is a plan view of the recording instrument used with the apparatus.

Figure 4 is a view of the differential pressure gauges in the apparatus after a container has ruptured.

Figure 1:
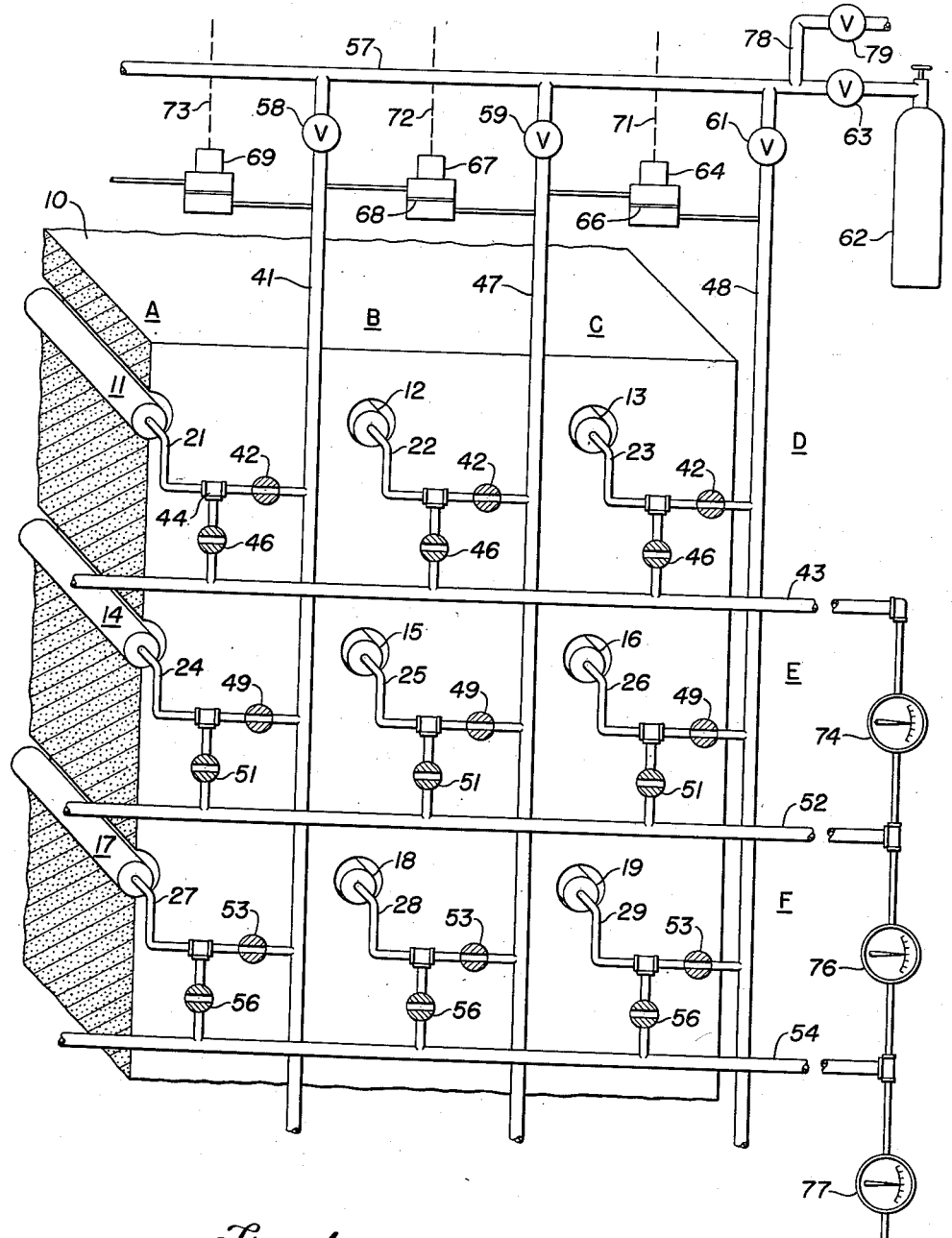
Figure 1 is a diagrammatic view of the apparatus partly in perspective and partly in section.

Referring to Figure 1, the pressurized fuel containers are shown mounted within the moderator or graphite structure 10. Only nine containers, numbers 11, 12, 13, 14, 15, 16, 17, 18, and 19, respectively, are shown in order to simplify the drawing. For the same reason, the reactor shield has been omitted. Actually, over one thousand three hundred containers are used in some reactors. The nine containers are shown arranged in three columns A, B and C, representing three parallel first dimensions of the pattern. Column A includes containers 11, 14 and 17; column B includes containers 12, 15 and 18; and column C includes containers 13, 16 and 19. The containers are also arranged in rows D, E and F, representing three parallel second dimensions of the pattern. Row D includes containers 11, 12 and 13; row E includes containers 14, 15 and 16; and row F includes containers 17, 18 and 19.

One end of each of the containers is coupled to a tubing; containers 11 through 19 being coupled to tubing, numbers 21, 22, 23, 24, 25, 26, 27, 28 and 29, respectively. A detailed view of the coupling between the tubing and the container is seen in Figure 2 where the tubing 21 is shown brazed to a cap 31 at their junction 32. The cap 31, in turn, is brazed to the wall of the container 11 at junction 33. Within the container 11 is shown a portion of the fuel slug 34 which has a channel 36 extending longitudinally in the surface thereof. Channel 36 mates with a similar channel 37 in the face of the cap 31. In this manner, tubing 21, cap 31 and container 11 are interconnected and hermetically sealed. Channels 36 and 37 permit the introduction of a gas through the tubing 21 down the length of the container 11.

Referring again to Figure 1, it is seen that the tubing 21 is connected to a vertical manifold 41 along one of the first dimensions of the pattern through a normally open valve 42 and is also connected to a horizontal manifold 43 along one of the intersecting second dimensions of the pattern through a T connection 44 and a normally closed valve 46. Similarly, tubings 22 and 23 are connected to vertical manifolds 47 and 48 through normally open valves 42 and to horizontal manifold 43 through normally closed valves 46. Containers 14, 15 and 16 in row E are connected to vertical manifolds 41, 47 and 48, respectively, through normally open valves 49. These containers are also connected through normally closed valves 51 to horizontal manifold 52. Containers 17, 18 and 19 in row F are connected to vertical manifolds 41, 47 and 48, respectively, through normally open valves 53 and to horizontal manifold 54 through normally closed valves 56. Vertical manifolds 41, 47 and 48, at the top, terminate in a common manifold 57 through supply valves 58, 59 and 61, respectively. Manifold 57 is connected to a gas source 62 through a main valve 63 and to a valved evacuating outlet 79 through tubing 78. Connected between vertical manifolds 47 and 48 is a differential pressure transmitter 64 containing a diaphragm 66. Between vertical manifolds 41 and 47 is connected a differential pressure transmitter 67 with a diaphragm 68. Manifold 41 is also connected to one side of a differential pressure transmitter 69. The differential pressure transmitters 64, 67 and 69 are conventional instruments used for converting a differential pressure into a proportional electrical signal. One model includes a magnetic core connected to the diaphragm of the transmitter and centered in the magnetic field of a dual coil. As the differential pressure changes, the diaphragm moves the core from its central position, changing the inductance in each half of the dual coil, thereby transmitting unequal voltages from each half of the coil. The electrical outputs from transmitters 64, 67 and 69 are represented by dotted lines 71, 72 and 73, respectively. Connected between the horizontal manifolds 43 and 52 at the right is a differential pressure gauge 74. A differential pressure gauge 76 is connected between horizontal manifolds 52 and 54 and manifold 54 is also connected to differential pressure gauge 77. These gauges are conventional differential pressure indicators. The sensing units are bellows which are connected to a pointer through mechanical linkage. As indicated in Figure 1, with zero differential pressure between adjacent horizontal manifolds the indicators remain in the center zero position.

On the initial startup of the system, a conventional vacuum pump is attached to valved outlet 79 and all the valves are opened except main valve 63 next to gas source 62. The vacuum pump will evacuate all the manifolds, couplings and containers. When this has been accomplished, valved outlet 79 is closed, valve 63 is opened and an inert gas such as helium is introduced from the gas source 62 until the entire system is filled to a pressure above atmospheric. Main valve 63, the vertical manifold supply valves 58, 59 and 61, and the series of horizontal manifold coupling valves 46, 51 and 56 are then all closed. The interior of each of the containers is now under a positive gas pressure and directly coupled to its vertical manifold. Since the number of containers in each column preferably is equal, the pressure in each vertical manifold is the same and the differential pressure between adjacent vertical manifolds is zero. Referring to differential pressure transmitter 64, it is seen that the pressure in manifold 48 is applied to the underside of diaphragm 66 and the pressure in manifold 47 is applied to the top of the diaphragm 66. Under zero differential pressure conditions, no vertical movement of the diaphragm takes place and the core connected thereto remains centrally located with respect to the dual coil as described hereinabove. With normal operating conditions, therefore, and no defective containers, the electrical output from transmitters 64, 67, 69, etc. will be substantially zero. It should be noted that although the pressure in the system normally changes with temperature, the fact that differential pressures are measured eliminates the effect of the temperature change. That is, the pressures in adjacent containers and manifolds will change substantially the same amount, being subjected to the same temperature changes.

Referring to Figure 3, the electrical outputs of the three transmitters are applied to the terminals of a scanning switch indicated generally by the arrow 81. The scanning switch 81 is a conventional telephone-type stepping switch which can be caused to continuously rotate at a predetermined rate, so that the common terminal 82 of switch 81 makes contact with each of the other three terminals an equal number of times through arm 85. The voltage picked up by terminal 82 is transmitted on conductor 83 to a recorder unit 84. The circular chart 86 is divided into equal segments 91, 92 and 93 corresponding to the recording area for the output of differential pressure transmitters 64, 67 and 69, respectively. As the scanning switch makes contact with each terminal, the applied voltage is indicated by the pen 87. Also included in the recorder unit 84, above the chart 86, are limit arms 88 and 89. The system as a whole for recording a plurality of electrical signals transmitted from several sources of electrical signals through a sequentially selective switch is of conventional design. If the pen 87 makes contact with either of the limit pointers, an alarm is set off by conventional relay circuits which indicates that the differential pressure between adjacent manifolds has increased to such an extent that some leak in the gas system has developed.

Referring again to Figure 1, assume that container 15 in column B ruptures a sufficient amount to cause the loss of a portion of the gas therein. Since this gas is under a positive pressure, it flows out of the container, still preventing any of the air or other reactor coolant from making contact with the fuel in the container. As the gas continues to flow out, the pressure in the entire vertical manifold 47 starts to drop and the differential pressure between manifolds 41 and 47 and manifolds 47 and 48 increases. Since manifold 47 is connected to the underside of diaphragm 68, this diaphragm moves down and causes a change in the position of the core attached thereto with a resulting change in the inductance of the dual coil. This gives rise to an unbalanced voltage output from transmitter 67 as seen on conductor 72. When the arm 85 of the scanning switch 81 comes in contact with the terminal connected to conductor 72, the indicator pen 87 will be deflected an amount proportional to the inductance unbalance in transmitter 67.

Similarly, diaphragm 66 in transmitter 64 is forced upwards to cause an inductance change in the opposite direction from that of transmitter 67 with a resulting voltage output on conductor 71. Therefore, when the arm 85 of scanning switch 81 makes contact with the terminal connected to conductor 71, the pen 87 of the recorder unit will be deflected a proportional amount in the opposite direction. This indication will continue until the pressure in manifold 47 decreases to such an extent that the voltage output from transmitters 64 and 67 will deflect pen 87 an amount sufficient to have the pen make contact with the limit arms 88 and 89. At this stage the alarm will ring. The operator, looking at the chart 86, can see that indications on segments 91 and 92 are beyond the allowable limits. Since the only vertical manifold common to both segments 91 and 92 (i. e. transmitters 64 and 67) is manifold 47, it becomes apparent that the ruptured container is in column B connected to that manifold. Accordingly, valves 63 and 59 and those of the set of valves 46, 51 and 56, which are in column B, are then promptly opened by a suitable means and more gas is introduced into vertical manifold 47 to restore the normal operating pressure. Those of the set of valves 42, 49 and 53, which are in column B, are then closed as are valves 59 and 63. As a result of the above-described valve manipulation, horizontal manifolds 43, 52 and 54 are now connected between each of the adjacent containers in vertical column B. Accordingly, the differential pressure gauges 74, 76 and 77 are now activated to give direct indication of the differential pressure between the adjacent horizontal manifolds.

Under the conditions where container 15 has ruptured, the gas now in horizontal manifold 52 and supplied to container 15 therefrom, being of a higher pressure than atmospheric, will flow out of the container. Therefore, the gas pressure in manifold 52 will drop and the differential pressures between manifolds 43 and 52 and manifolds 54 and 52 will start to increase, respectively. The indicators 74 and 76 will continue to show a higher differential pressure between the horizontal manifolds adjacent to manifold 52 until the indication of Figure 4 is reached. Referring to Figure 4, it is seen that the indicators point towards manifold 52 as the manifold connected to the ruptured container. Therefore, the defective container has now been definitely ascertained. The container must be in the vertical column B, including containers 12, 15 and 18 and must also be in the horizontal row E, including containers 14, 15 and 16. It is apparent that container 15 is the only container which will satisfy both conditions. The container, thus detected and segregated, may now be cut off and removed from the remainder of the system, and a new container installed. Thereafter, the vertical manifold 47 is again filled with gas and the horizontal manifold valves 46, 51 and 56 of column B are again closed and an intact reactor assembly is once again established. The leak detection system has, therefore, enabled the operator to prevent continual contamination of the exhaust fans, or other damage, by identifying the gas leak from the proper container.

It should be noted that with the apparatus described above, no oxidation of the fuel takes place. It is well known that fuels, such as uranium, are easily oxidized and thereby caused to expand. Therefore, without the present invention, a container that develops a small hole may not release a large amount of radioactive fission products immediately but the resulting oxidation of the fuel would cause the container to burst and result in a great deal of contamination. With the present invention, the gas under positive pressure prevents any air from entering the defective container. The gas in the detection apparatus, therefore, serves the dual purpose of preventing oxidation and giving evidence of a leak.

Still another function of the gas is to transfer the heat developed in the fuel to the walls of the container where the coolant may carry it away. Since helium is an excellent heat transfer medium, the use of this gas or one with similar properties will increase the efficiency of the cooling system.

Although the above apparatus has been described only with reference to nine containers, it is apparent that the number of containers poses no problem. The containers can alway be disposed within a grid pattern of columns and rows, or equivalent dimensions, with the appropriate instruments connected between adjacent columns and adjacent rows. Disposition of the containers within a pattern of first and second dimensions does not mean that a perpendicular relation of dimensions is necessary. For example, if the containers are arranged in concentric circles, the first dimensions would consist of the circles and the second dimensions would consist of radial lines which include one container from each circle thus effecting a polar coordinate pattern. Therefore, by referring to first and second dimensions, it is meant to indicate that any first dimensions which can include only one container appearing in any second dimension will be suitable for use in carrying out the invention.

By use of the subject system, the number of the more expensive and sensitive differential pressure transmitters and differential pressure gauges are kept to a minimum as these instruments need only be used between adjacent manifolds rather than between each of the adjacent containers.

After a period of time, if no leaks develop in the present system, the gas is replaced by fresh gas to remove impurities that might contaminate the system or cut down the rate of heat transfer in the containers. This replacement is accomplished in the same manner as the initial startup of the system. One system that has operated satisfactorily uses helium as the fluid under a pressure of one pound per square inch gauge. The recording system is adjusted to indicate a pressure differential from zero to twenty-five inches of water and the alarm limits may be set anywhere between those values.

While the salient features of this invention have been described in detail with respect to one embodiment, it will, of course, be apparent that numerous modifications may be made within the spirit and scope of this inventiond and it is, therefore, not desired to limit the invention to the exact details shown except insofar as they may be defined in the following claims.

We claim:

1. Leak detection apparatus adapted for use with a plurality of hermetically sealed pressurized containers arranged in a pattern having first and second dimensions which comprises, in combination, a first series of manifolds connected by separate conduits to containers arranged along said first dimension, a second series of manifolds connected by separate conduits to containers arranged along said second dimension, each container being connected to one manifold in said first series and one manifold in said second series, a first series of separately operable valves located in the conduits between the first series of manifolds and the containers and a second series of separately operable valves located in the conduits between the second series of manifolds and the containers, said valves being disposed with a separate valve in each series serving each container, a fluid source connected to said first series of manifolds, supply valves in said first series of manifolds, means for indicating a differential pressure between adjacent manifolds of said first series and means for indicating a differential pressure between adjacent manifolds in said second series.

2. Apparatus of claim 1 wherein said pattern is a rectangular figure with the first dimension consisting of a vertical column and the second dimension consisting of a horizontal row.

3. Leak detection apparatus adapted for use with a plurality of hermetically sealed pressurized containers arranged in a pattern having first and second dimensions which comprises, in combination, a first series of manifolds connected by separate conduits to containers arranged along said first dimension, a second series of manifolds connected by separate conduits to containers arranged along said second dimension, each container being connected to one manifold in said first series and one manifold in said second series, a first series of separately operable valves located in the conduits between the first series of manifolds and the containers and a second series of separately operable valves located in the conduits between the second series of manifolds and the containers, said valves being disposed with a separate valve in each series serving each container, a fluid source connected to said first series of manifolds, supply valves in said first series of manifolds, a series of pressure differential transmitters connected between adjacent manifolds of said first series, a separate transmitter of said series being disposed between each pair of adjacent manifolds to measure a pressure differential therebetween and transmit the information to a remote indicator and means for indicating a differential pressure between adjacent manifolds in said second series.

4. In combination, a neutronic reactor including fissionable fuel elements encased in hermetically sealed pressurized containers, said containers being arranged in the reactor moderator in a rectangular pattern with vertical columns and horizontal rows and leak detection apparatus including a first series of manifolds connected by separate conduits to containers arranged in said vertical columns, a second series of manifolds connected by separate conduits to containers arranged in said horizontal rows, each container being connected to one manifold in said first series and one manifold in said second series, a first series of separately operable valves located in the conduits between the first series of manifolds and the containers and a second series of separately operable valves located in the conduits between the second series of manifolds and the containers, said valves being disposed with a separate valve in each series serving each container, a fluid source connected to said first series of manifolds, supply valves in said first series of manifolds, means for indicating a differential pressure between adjacent manifolds of said first series and means for indicating a differential pressure between adjacent manifolds in said second series.

References Cited in the file of this patent

UNITED STATES PATENTS

| | | |
|---|---|---|
| 378,283 | Breck | Feb. 21, 1888 |
| 2,008,934 | Smith | July 23, 1935 |
| 2,427,370 | Schweitzer | Sept. 16, 1947 |
| 2,449,271 | Bennett et al. | Sept. 14, 1948 |
| 2,449,556 | Kirkley | Sept. 21, 1948 |
| 2,551,526 | Campbell | May 1, 1951 |
| 2,573,053 | Pearlman | Oct. 30, 1951 |